(12) United States Patent
Song et al.

(10) Patent No.: US 11,694,338 B2
(45) Date of Patent: Jul. 4, 2023

(54) 3D MODELING METHOD FOR CEMENTING HYDRATE SEDIMENT BASED ON CT IMAGE

(71) Applicant: DALIAN UNIVERSITY OF TECHNOLOGY, Liaoning (CN)

(72) Inventors: Yongchen Song, Liaoning (CN); Yanghui Li, Liaoning (CN); Peng Wu, Liaoning (CN); Xiang Sun, Liaoning (CN); Weiguo Liu, Liaoning (CN); Jiafei Zhao, Liaoning (CN); Mingjun Yang, Liaoning (CN); Lei Yang, Liaoning (CN); Zheng Ling, Liaoning (CN)

(73) Assignee: DALIAN UNIVERSITY OF TECHNOLOGY, Liaoning (CN)

(*) Notice: Subject to any disclaimer, the term of this patent is extended or adjusted under 35 U.S.C. 154(b) by 257 days.

(21) Appl. No.: 17/415,621

(22) PCT Filed: Jul. 23, 2020

(86) PCT No.: PCT/CN2020/103667
§ 371 (c)(1),
(2) Date: Jun. 17, 2021

(87) PCT Pub. No.: WO2022/000627
PCT Pub. Date: Jan. 6, 2022

(65) Prior Publication Data
US 2022/0230326 A1 Jul. 21, 2022

(30) Foreign Application Priority Data

Jul. 3, 2020 (CN) .......................... 202010629411.2

(51) Int. Cl.
*G06T 7/155* (2017.01)
*G06V 10/46* (2022.01)
*G06T 17/10* (2006.01)

(52) U.S. Cl.
CPC .............. *G06T 7/155* (2017.01); *G06T 17/10* (2013.01); *G06V 10/467* (2022.01); *G06T 2207/10081* (2013.01); *G06T 2207/20036* (2013.01)

(58) Field of Classification Search
CPC ..................... G06T 7/155; G06T 17/10; G06T 2207/10081; G06T 2207/20036;
(Continued)

(56) References Cited

FOREIGN PATENT DOCUMENTS

| CN | 102222359 A | 10/2011 |
|---|---|---|
| CN | 103325137 A | 9/2013 |

(Continued)

*Primary Examiner* — Christopher M Brandt
(74) *Attorney, Agent, or Firm* — Muncy, Geissler, Olds & Lowe, P.C.

(57) ABSTRACT

The present invention belongs to the technical field of petroleum exploitation engineering, and discloses a 3D modeling method for cementing hydrate sediment based on a CT image. Indoor remolding rock cores or in situ site rock cores without hydrate can be scanned by CT; a sediment matrix image stack and a pore image stack are obtained by gray threshold segmentation; then, a series of cementing hydrate image stacks with different saturations are constructed through image morphological processing of the sediment matrix image stack such as dilation, erosion and image subtraction operation; and a series of digital rock core image stacks of the cementing hydrate sediment with different saturations are formed through image subtraction operation and splicing operation to provide a relatively real 3D model for the numerical simulation work of the basic physical properties of a reservoir of natural gas hydrate.

1 Claim, 3 Drawing Sheets

(58) Field of Classification Search
CPC ......... G06T 17/00; G06T 7/55; G06V 10/467;
G06V 10/22; G01V 99/00; G01V 5/005;
G01N 23/046
See application file for complete search history.

(56) References Cited

FOREIGN PATENT DOCUMENTS

| | | | |
|---|---|---|---|
| CN | 105487121 | A | 4/2016 |
| CN | 106324002 | A | 1/2017 |
| CN | 107449707 | A | 12/2017 |
| CN | 108303360 | A | 7/2018 |
| CN | 108763711 | A | 11/2018 |
| CN | 109448104 | A | 3/2019 |
| CN | 109697752 | A | 4/2019 |
| JP | 2011242231 | A | 12/2011 |

3D MODELING METHOD FOR CEMENTING HYDRATE SEDIMENT BASED ON CT IMAGE

TECHNICAL FIELD

The present invention belongs to the technical field of petroleum exploitation engineering, and relates to a 3D modeling method for cementing hydrate sediment based on a CT image.

BACKGROUND

Natural gas hydrate is clean energy with abundant reserves and is widely distributed undersea and in permafrost in a cementing type or a pore-filling type. It is estimated that the resources of the natural gas hydrate are twice the total reserves of known coal, petroleum and conventional natural gas, and more than 10 times the total amount of all of the global conventional natural gas.

At present, China, India, Korea, Japan and the like have delineated the hydrate development prospect areas, formulated corresponding development plans, and carried out massive research on basic physical properties of hydrate-bearing sediment such as seepage, heat conduction, electricity conduction and mechanics. However, it is difficult and costly to take the core under pressure in the reservoir of the natural gas hydrate, and the hydrate is disturbed and decomposed in the process of sample transfer. Meanwhile, remolding of indoor hydrate samples cannot accurately control the occurrence type and saturation of the hydrate, and experimental repeatability is poor. In contrast, if 3D digital rock cores (the cementing type and the pore-filling type) close to the in situ reservoir structure can be obtained through a numerical simulation method and relevant numerical analysis of the basic physical properties is conducted, the experimental cost of the hydrate will be reduced obviously and the experimental repeatability is good; and the basic physical properties of the hydrate reservoir are rapidly and accurately evaluated.

The present invention relates to a 3D modeling method for cementing hydrate sediment based on a CT image. Remolding or in situ rock cores without the natural gas hydrate are scanned by CT; a series of digital rock core image stacks of cementing type natural gas hydrate sediment with different saturations are constructed through image morphological calculation to provide a relatively real 3D numerical model for the numerical simulation analysis of the basic physical properties of the reservoir of the natural gas hydrate.

SUMMARY

The main purpose of the present invention is to propose a 3D modeling method for cementing hydrate sediment based on a CT image to provide a relatively real 3D numerical model for the numerical simulation analysis of the basic physical properties of the reservoir of the natural gas hydrate.

The technical solution of the present invention is as follows:

step 1, scanning remolding or in situ rock cores without natural gas hydrate by CT to obtain digital rock core image stacks;

step 2, adjusting the gray threshold of the digital rock core image stacks, conducting binarization segmentation to obtain a sediment matrix and a pore, and respectively saving as the image stacks;

step 3, firstly dilating a sediment matrix image stack obtained in step 2 at x pixel and then eroding at x pixel;

step 4, performing image subtraction; and subtracting the sediment matrix image stack obtained in step 2 from the (eroded) sediment matrix image stack obtained in step 3 to obtain a cementing hydrate image stack;

step 5, performing image subtraction again; and subtracting the cementing hydrate image stack obtained in step 4 from the pore image stack obtained in step 2 to obtain a new pore image stack corresponding to the cementing hydrate image stack obtained in step 4;

step 6, splicing and combining the sediment matrix image stack obtained in step 2, the cementing hydrate image stack obtained in step 4 and the new pore image stack obtained in step 5 to form a digital rock core image stack with the sediment matrix, the cementing hydrate and the pore, which is the digital rock core image stack of the cementing hydrate sediment;

step 7, repeatedly executing step 3 to step 6, and adjusting x value to obtain the digital rock core image stacks of the cementing hydrate sediment with different hydrate saturations.

The present invention has the beneficial effects that: a series of digital rock core image stacks of cementing hydrate sediment with different saturations can be constructed based on the remolding or in situ rock cores without the natural gas hydrate through image morphological calculation to provide the relatively real 3D numerical model for the numerical simulation analysis of the basic physical properties of the hydrate reservoir. The experimental cost of the hydrate is reduced obviously and the experimental repeatability is good; and the basic physical properties of the hydrate reservoir are rapidly and accurately evaluated.

DETAILED DESCRIPTION

Specific embodiments of the present invention are further described below in combination with accompanying drawings and the technical solution.

Embodiments

Figure 1:
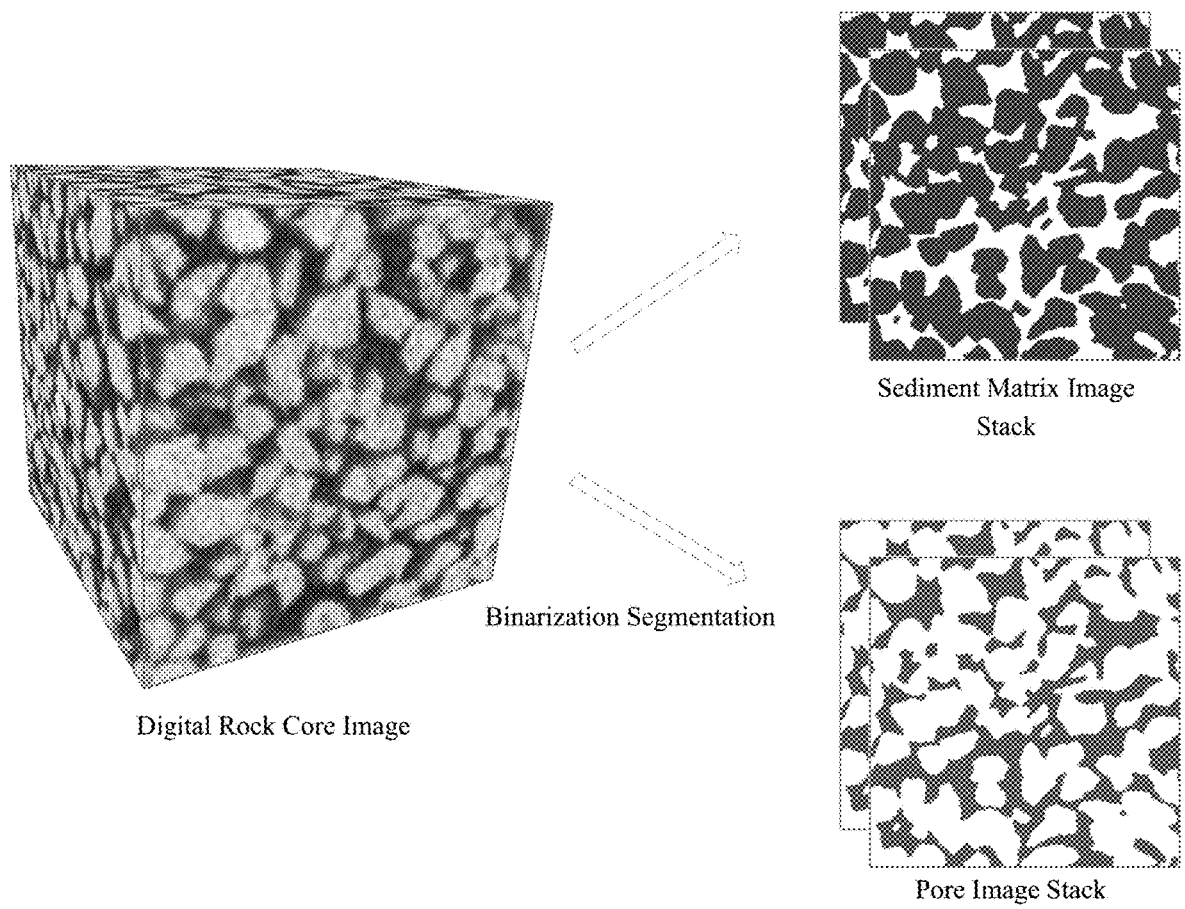
FIG. 1 shows the binarization results of sediment matrices and pores.
Figure 2:
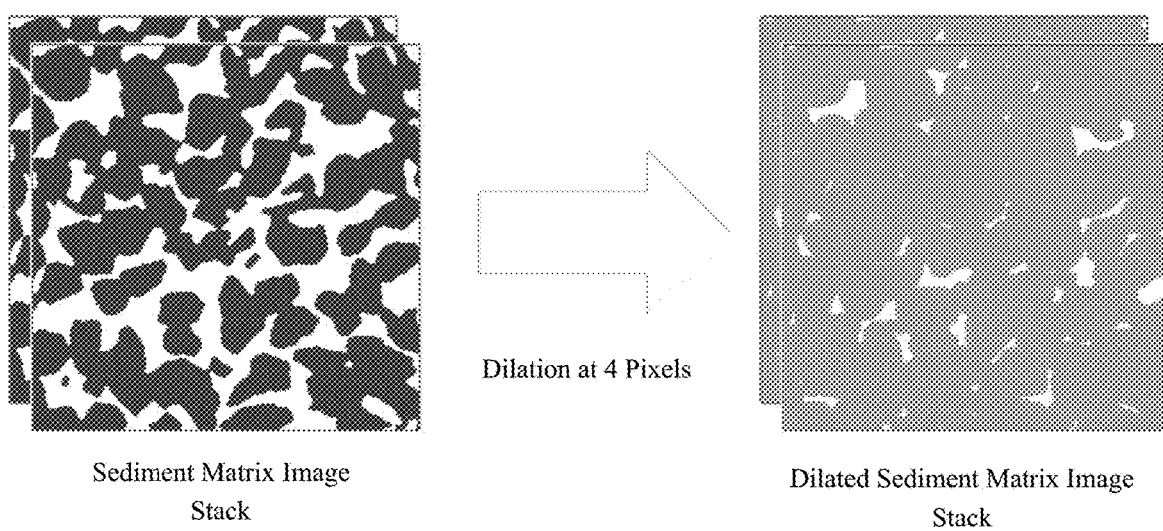
FIG. 2 is a schematic diagram of image dilation at 4 pixels.
Figure 3:
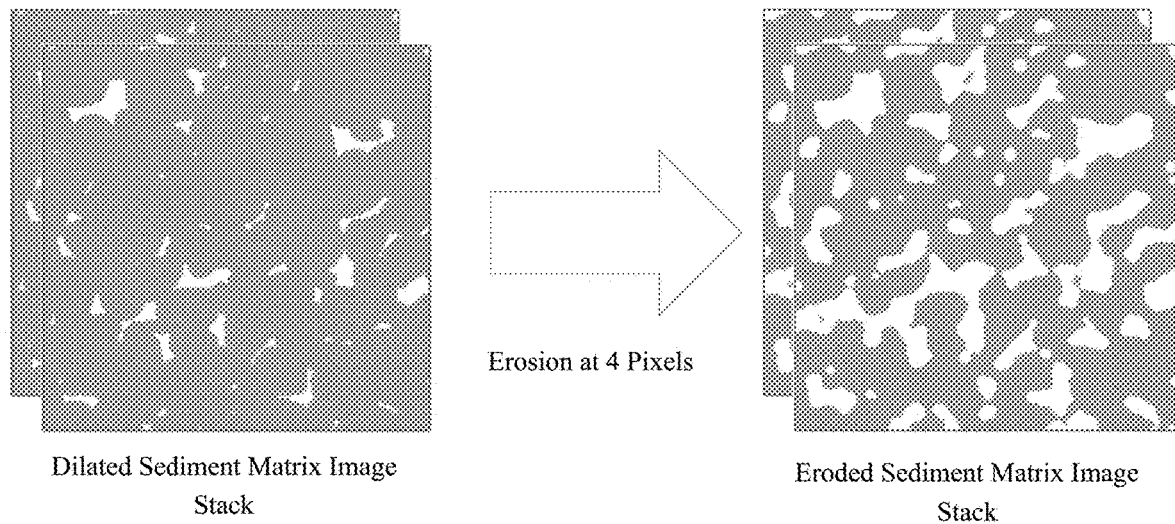
FIG. 3 is a schematic diagram of image erosion at 4 pixels.
Figure 4:
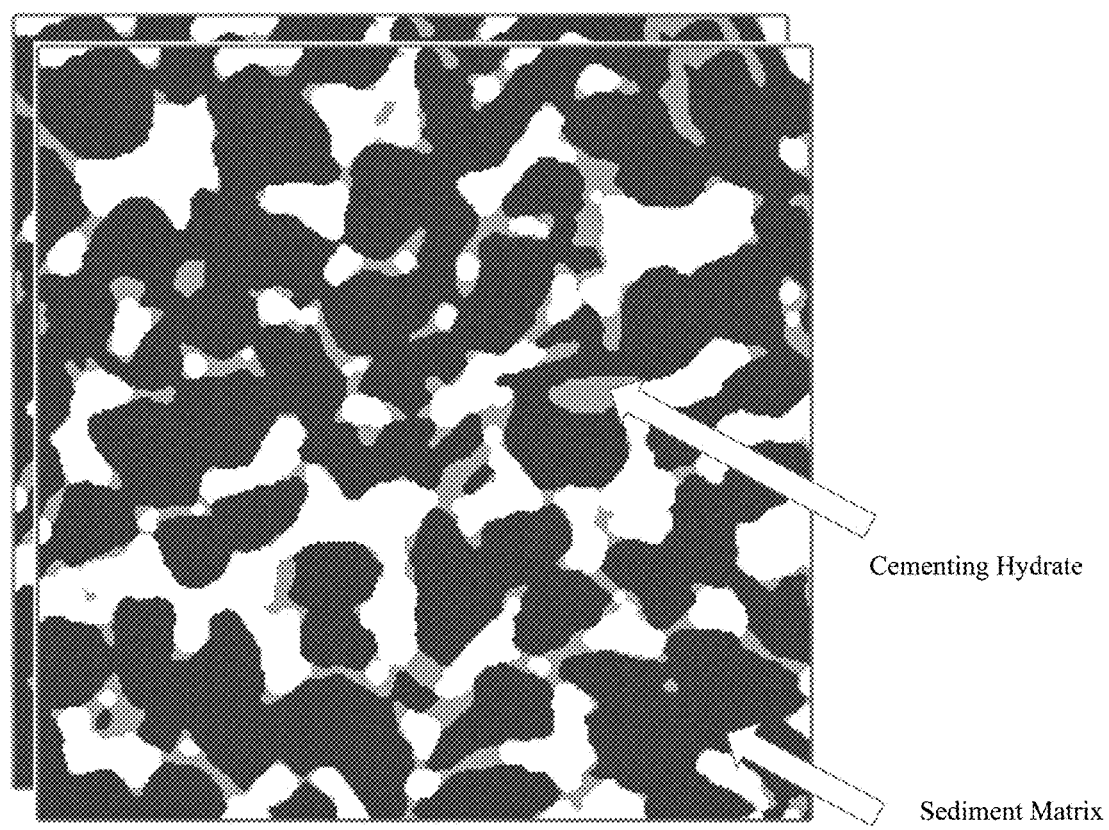
FIG. 4 shows the result of image subtraction.
Figure 5:
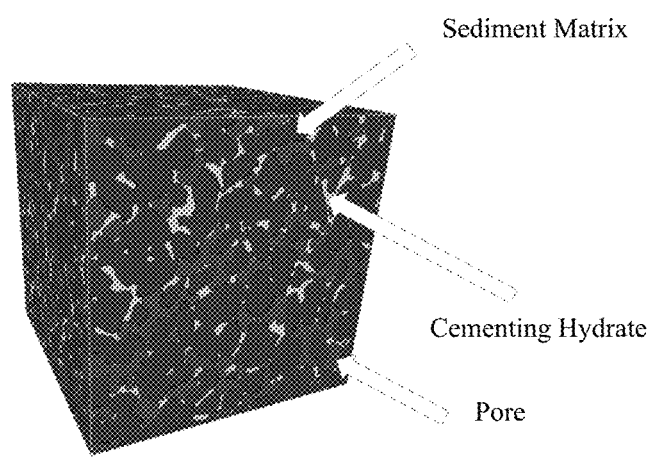
FIG. 5 shows a digital rock core image stack of cementing hydrate sediment.

A 3D modeling method for cementing hydrate sediment based on a CT image comprises the following steps:

step 1, scanning remolding rock cores (particle size distribution: 0.01-1 mm; median particle size: 0.15 mm; porosity: 41%) without natural gas hydrate by CT to obtain digital rock core image stacks (resolution: 1024*1024; voxel size: 0.004 mm);

step 2, adjusting the gray threshold of the digital rock core image stacks, conducting binarization segmentation to obtain a sediment matrix and a pore, and respectively saving as the image stacks, as shown in FIG. 1;

step 3, firstly dilating a sediment matrix image stack obtained in step 2 at 4 pixels, as shown in FIG. 2, and then eroding at 4 pixels, as shown in FIG. 3;

step 4, performing image subtraction; and subtracting the sediment matrix image stack obtained in step 2 from the (eroded) sediment matrix image stack obtained in step 3 to obtain a cementing hydrate image stack, as shown in FIG. 4;

step 5, performing image subtraction again; and subtracting the cementing hydrate image stack obtained in step 4 from the pore image stack obtained in step 2 to obtain a new pore image stack corresponding to the cementing hydrate image stack obtained in step 4;

step 6, splicing and combining the sediment matrix image stack obtained in step 2, the cementing hydrate image stack obtained in step 4 and the new pore image stack obtained in step 5 to form a digital rock core image stack with the sediment matrix, the cementing hydrate and the pore, which is the digital rock core image stack of the cementing hydrate sediment (saturation: 26.1%), as shown in FIG. 5.

The invention claimed is:

1. A 3D modeling method for cementing hydrate sediment based on CT image, comprising steps of:

step 1, scanning remolding or in situ rock cores without natural gas hydrate by CT to obtain digital rock core image stacks;

step 2, adjusting the gray threshold of the digital rock core image stacks, conducting binarization segmentation to obtain a sediment matrix and a pore, and respectively saving as the image stacks;

step 3, firstly dilating a sediment matrix image stack obtained in step 2 at x pixel and then eroding at x pixel;

step 4, performing image subtraction; and subtracting the sediment matrix image stack obtained in step 2 from the sediment matrix image stack obtained in step 3 to obtain a cementing hydrate image stack;

step 5, performing image subtraction again; and subtracting the cementing hydrate image stack obtained in step 4 from the pore image stack obtained in step 2 to obtain a new pore image stack corresponding to the cementing hydrate image stack obtained in step 4;

step 6, splicing and combining the sediment matrix image stack obtained in step 2, the cementing hydrate image stack obtained in step 4 and the new pore image stack obtained in step 5 to form a digital rock core image stack with the sediment matrix, the cementing hydrate and the pore, which is the digital rock core image stack of the cementing hydrate sediment;

step 7, repeatedly executing step 3 to step 6, and adjusting x value to obtain the digital rock core image stacks of the cementing hydrate sediment with different hydrate saturations.

* * * * *